(No Model.) 2 Sheets—Sheet 1.

A. L. WOOD.
Apparatus for Aging Liquors.

No. 229,223. Patented June 22, 1880.

Witnesses:
Henry Chadbourn.
John H. Foster.

Inventor:
Amos L. Wood.
by Alban Andrew
his atty.

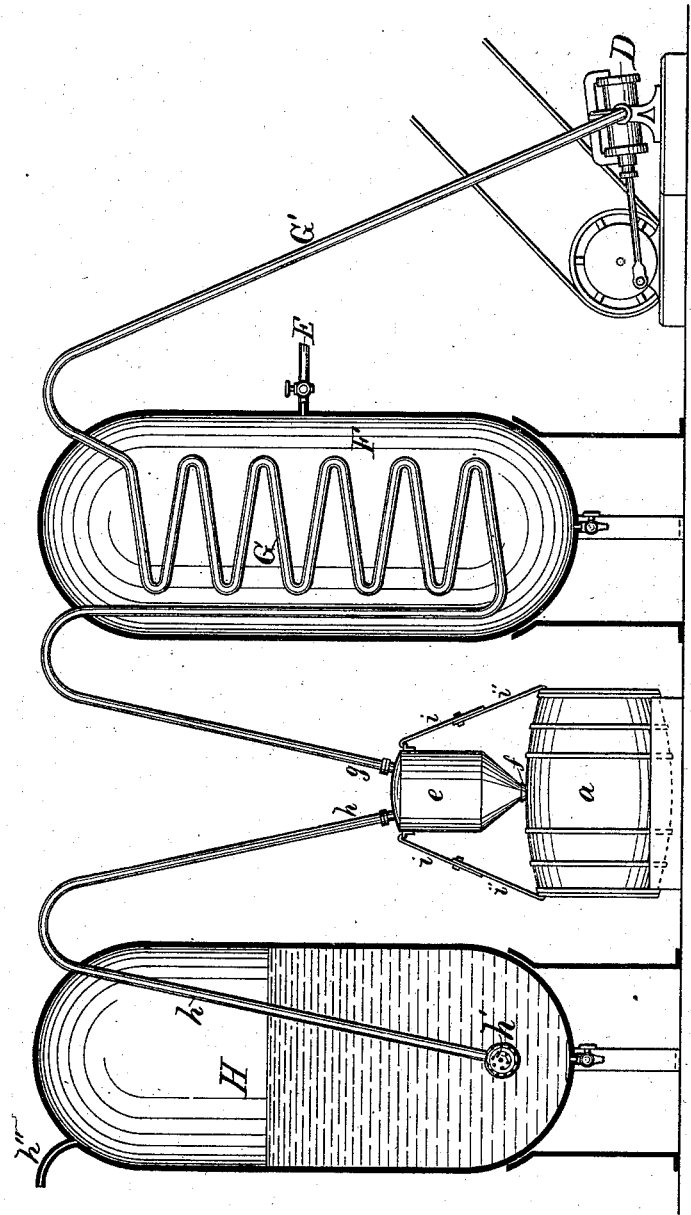

UNITED STATES PATENT OFFICE.

AMOS L. WOOD, OF BOSTON, MASSACHUSETTS.

APPARATUS FOR AGING LIQUORS.

SPECIFICATION forming part of Letters Patent No. 229,223, dated June 22, 1880.

Application filed March 17, 1880. (No model.)

*To all whom it may concern:*

Be it known that I, AMOS L. WOOD, a citizen of the United States, residing at Boston, in the county of Suffolk and State of Massachusetts, have invented certain new and useful Improvements in Aging Liquors; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain improvements in that class of inventions known as apparatus for purifying and aging distilled spirits, when contained in the original stamped barrel or package, without emptying it into a purifying-tank and destroying its identity or the required revenue-stamps.

To this end my invention consists in the combination, in an apparatus for purifying and aging distilled spirits, of a saving or overflow chamber provided with a contracted nozzle or spout and an eduction-pipe, a hot-air pipe passing through said saving or overflow chamber and terminating in a perforated bent portion below the nozzle or spout thereof, a heater and a heating-pipe passing through said heater and connected with the hot-air pipe, a suitable air-forcing apparatus connected with the heating-pipe, a condenser, and pipe terminating therein.

It further consists in the combination, with the barrel or package for containing the liquor to be aged and the perforated pipe, of a saving or overflow chamber directly connected with the barrel.

Figure 1:
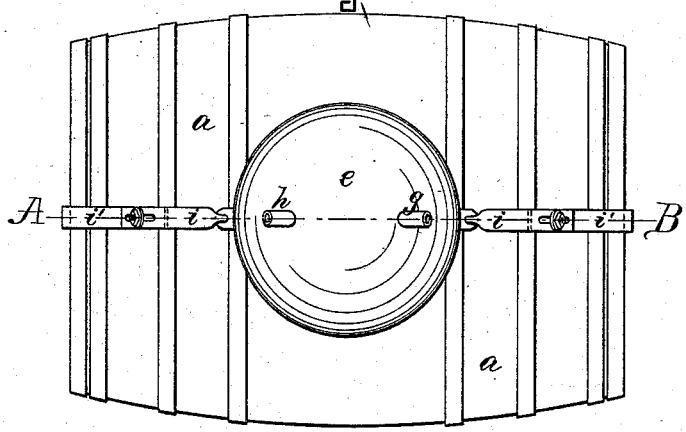
Figure 3:
Figure 2:
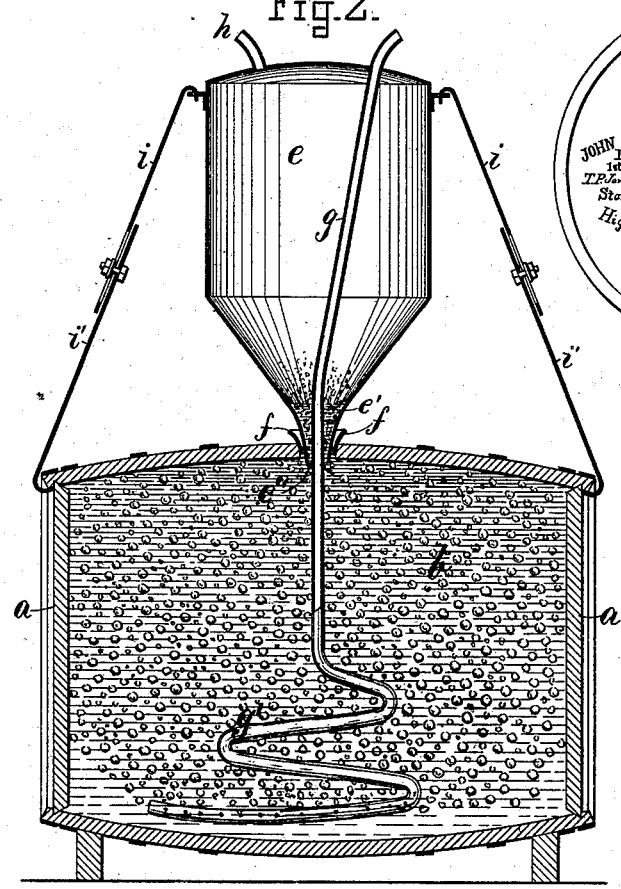

Figure 1 represents a plan view of a barrel provided with my improved apparatus. Fig. 2 represents a central longitudinal section on the line A B, shown in Fig. 1. Fig. 3 represents an end view of a stamped liquor-barrel, and Fig. 4 represents a sectional elevation of the apparatus used for forcing the heated air to and from the liquor contained in a barrel.

Similar letters refer to similar parts wherever they occur on the different parts on the drawings.

$a$ represents a liquor-barrel containing liquor, $b$, and having on one of its heads a distiller's warehouse-stamp, $c$, and a United States tax-stamp, $d$, as usual.

$e$ represents a saving or overflow chamber, having an open-mouthed conical neck, $e'$, adapted to fit within the bung-hole of the barrel, as shown.

$f$ is an annular elastic packing located between the inside of the bung-hole and the exterior of the conical neck $e'$, as shown in Fig. 2.

$g$ is a hot-air pipe leading from the coiled pipe G, located within the heater F, into which steam is forced through the pipe E, as shown in Fig. 4.

D is the pump or air-distributer, by means of which the air is forced through the pipe G' to the coiled pipe G, where it is heated, and passes on through the hot-air pipe $g$, and thence through the liquor contained in the barrel, for which purpose the air-pipe $g$ is made to terminate within the barrel $a$ as a perforated bent pipe or coil, $g'$, of such a suitable form that it may be inserted through the bung-hole of the barrel.

$e''$ is an annular space between the pipe $g$ and the interior part of the open neck $e'$ of the saving or overflow chamber $e$, through which the saving or overflow is forced into the air-chamber $e$ after passing through the contents of the barrel.

$h$ is an outlet-pipe from the top of the saving or overflow chamber $e$, which terminates within the water-tank H as a perforated bulb, $h'$, as shown in Fig. 4.

$h''$ is an outlet-pipe from the upper part of the water-tank H, through which the impurities and poisonous gases are expelled, which pipe may lead directly to the outer atmosphere, or to a second perforated bulb located within a second water-tank, if so desired.

$i'$ $i''$ $i'$ $i''$ are jointed fastening rods or links, for the purpose of temporarily securing the saving or overflow chamber $e$ to the barrel $a$ in a position as represented in Fig. 2.

The operation is as follows: After the saving or overflow chamber $e$ has been secured in its proper place in relation to its barrel, as shown in Fig. 2, and its perforated coiled or bent pipe $g'$ immersed within the liquor contained in the barrel, I force heated air through the said pipe $g$, which, as it escapes through the perforated pipe $g'$, passes through and comes in immediate contact with every part of the liquor b, as shown, and thus by heating and agitating the liquor by means of the heated air the impurities are taken from the liquor and forced upward through the annular space e″ into the saving or overflow chamber e, and thence through the pipe h and perforated bulb h′ into the liquid contents of the water-tank H, where the alcohol or other matters brought by the heated air from the liquor are arrested.

The saving or overflow chamber e serves for the purpose of retaining any portion of the liquor or its proof that may be forced with the impurities up through the annular space e″, and to return it by condensation, in a liquid state, to the barrel, and thus prevent the waste of the liquor or any material lowering of its proof.

The hot air is forced through the contents of the barrel and its delivery-pipe g g′ by the means of the air-distributer D, pipe G′, and coil G, contained within the steam-heater F, as above described.

It is obvious that any number of barrels may simultaneously be operated upon from one and the same air-distributer, heater, and water tank or tanks without departing from my invention.

Having fully described my invention, what I claim is—

1. In an apparatus for aging liquors, the combination, with the saving or overflow chamber e, constructed essentially as set forth, of the hooked adjustable extension-rods, substantially as described.

2. In an apparatus for aging liquors, the combination of the saving or overflow chamber e, provided with a contracted nozzle or spout and eduction-pipe h, the hot-air pipe g, passing through said chamber and terminating in a perforated bent portion below the nozzle or spout thereof, the heater, the heating-pipe G′, passing through said heater and connecting with the hot-air pipe g, a suitable air-forcing apparatus connected with said heating-pipe, the condenser H, and the pipe terminating therein and connected with the eduction-pipe h, substantially as and for the purpose set forth.

3. In apparatus for aging liquor, the combination, with the barrel or package for containing the liquor to be aged and the perforated pipe, of a saving or overflow chamber directly connected with the barrel, substantially as and for the purpose described.

In testimony whereof I have affixed my signature in presence of two witnesses.

AMOS L. WOOD.

Witnesses:
ALBAN ANDRÉN,
HENRY CHADBOURN.